US009087272B2

(12) United States Patent
Geva

(10) Patent No.: US 9,087,272 B2
(45) Date of Patent: Jul. 21, 2015

(54) OPTICAL MATCH CHARACTER CLASSIFICATION

(71) Applicant: International Business Machines Corporation, Armonk, NY (US)

(72) Inventor: Amir Geva, Yokneam (IL)

(73) Assignee: International Business Machines Corporation, Armonk, NY (US)

(*) Notice: Subject to any disclaimer, the term of this patent is extended or adjusted under 35 U.S.C. 154(b) by 63 days.

(21) Appl. No.: 13/943,826

(22) Filed: Jul. 17, 2013

(65) Prior Publication Data
US 2015/0023599 A1 Jan. 22, 2015

(51) Int. Cl.
G06K 9/62 (2006.01)
G06K 9/68 (2006.01)

(52) U.S. Cl.
CPC ............ G06K 9/685 (2013.01); *G06K 2209/01* (2013.01)

(58) Field of Classification Search
USPC .......................... 382/176, 177, 199, 218, 221
See application file for complete search history.

(56) References Cited

U.S. PATENT DOCUMENTS

| 5,751,855 | A | * | 5/1998 | Saund | 382/224 |
| 5,883,986 | A | * | 3/1999 | Kopec et al. | 382/310 |
| 5,911,005 | A | * | 6/1999 | Uchiyama | 382/187 |
| 5,956,419 | A | * | 9/1999 | Kopec et al. | 382/159 |
| 6,081,621 | A | * | 6/2000 | Ackner | 382/216 |
| 7,627,177 | B2 | | 12/2009 | Tzadok et al. | |
| 8,682,077 | B1 | * | 3/2014 | Longacre, Jr. | 382/181 |
| 2002/0097912 | A1 | | 7/2002 | Kimmel et al. | |
| 2003/0059115 | A1 | | 3/2003 | Nakagawa | |
| 2003/0198386 | A1 | * | 10/2003 | Luo | 382/199 |
| 2006/0045322 | A1 | * | 3/2006 | Clarke et al. | 382/137 |
| 2012/0051633 | A1 | * | 3/2012 | Kim et al. | 382/164 |
| 2012/0072859 | A1 | * | 3/2012 | Wang et al. | 715/764 |
| 2012/0099792 | A1 | | 4/2012 | Chevion et al. | |
| 2012/0237116 | A1 | * | 9/2012 | Xiao | 382/159 |
| 2013/0039591 | A1 | | 2/2013 | De Muelenaere et al. | |
| 2014/0086483 | A1 | * | 3/2014 | Zhang et al. | 382/165 |

FOREIGN PATENT DOCUMENTS

CN 102024138 1/2013

OTHER PUBLICATIONS

Kluzner et al., "Hybrid Approach to Adaptive OCR for Historical Books", International Conference on Document Analysis and Recognition, 2011.

(Continued)

*Primary Examiner* — Aaron W Carter
(74) *Attorney, Agent, or Firm* — Alexander Jochym; Suzanne Erez

(57) ABSTRACT

Machines, systems and methods for enhanced optical character recognition are provided. In one embodiment, the method comprises identifying a sample character in a textual context to be optically recognized; comparing the sample character with a template character, wherein the sample character is scaled into a first grid and the template character is scaled into a second grid; identifying one or more pixels in the sample character within the first grid and one or more pixels in the template character in the second grid, wherein the one or more pixels are identified as belonging to a foreground category in the textual content, a foreground pixel having at least N gradients corresponding to edges of the foreground pixel that are juxtaposed to a neighbor pixel, wherein a contour foreground pixel has at least one gradient that is neighbored by a background pixel in the textual context.

20 Claims, 6 Drawing Sheets

(56) References Cited

OTHER PUBLICATIONS

Koppula et al., "Fringe Map Based Text Line Segmentation of Printed Telugu Document Images", International Conference on Document Analysis and recognition (ICDAR), pp. 1294-1298, 2011.

Oh et al., "Distance features for neural network-based recognition of handwritten characters", International Journal on Document Analysis and Reocgnition, vol. 1, pp. 73-88, 1998.

Shrivastava et al., "Artificial neural network based optical character recognition", Signal & Image Processing : An International Journal (SIPIJ), vol. 3, No. 5, Oct. 2012.

Arlandis et al., "Handwritten Character Recognition using the Continuos Distance Transformation", 15th International Conference on Pattern Recognition, vol. 1, pp. 940-943, 2000.

* cited by examiner

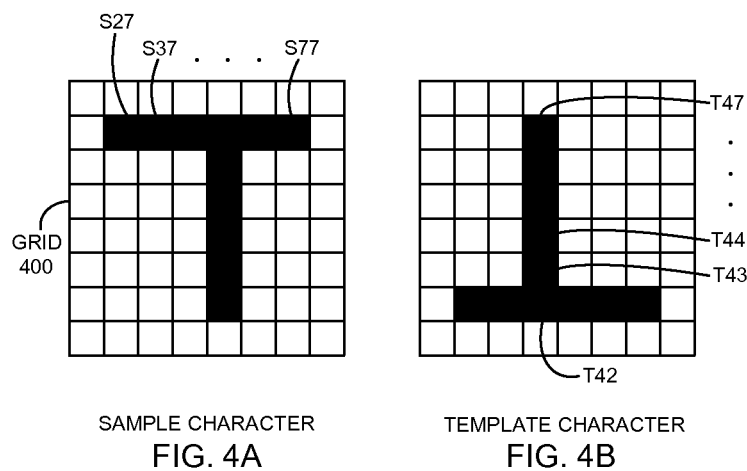
SAMPLE CHARACTER
FIG. 4A
TEMPLATE CHARACTER
FIG. 4B
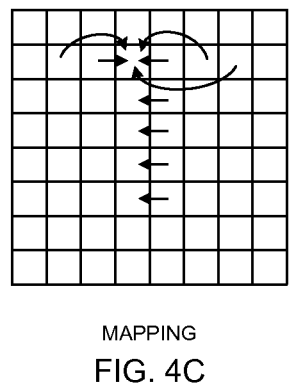
MAPPING
FIG. 4C

OPTICAL MATCH CHARACTER CLASSIFICATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the field of optical character recognition (OCR) and, more particularly, to enhancing OCR output quality.

BACKGROUND

Optical character recognition (OCR) refers to the process of scanning or imaging printed, typewritten, handwritten, or other written text, and producing machine-recognizable text from the images. Due to imperfections in the documents, artifacts introduced during the imaging or scanning process, and shortcomings of OCR applications, errors often exist in the produced machine-recognizable text. Therefore, it would be desirable to efficiently identify and correct OCR errors and enhance the quality of text recognition.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for enhanced optical character recognition are provided. In one embodiment, the method comprises identifying a sample character in a textual context to be optically recognized; comparing the sample character with a template character, wherein the sample character is scaled into a first grid and the template character is scaled into a second grid; identifying one or more pixels in the sample character within the first grid and one or more pixels in the template character in the second grid, wherein the one or more pixels are identified as belonging to a foreground category in the textual content, a foreground pixel having at least N gradients corresponding to edges of the foreground pixel that are juxtaposed to a neighbor pixel, wherein a contour foreground pixel has at least one gradient that is neighbored by a background pixel in the textual context.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIGS. 4A, 4B and 4C illustrate exemplary sample characters in a grid, in relation with a mapping mechanism, in accordance with an embodiment of the present invention.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
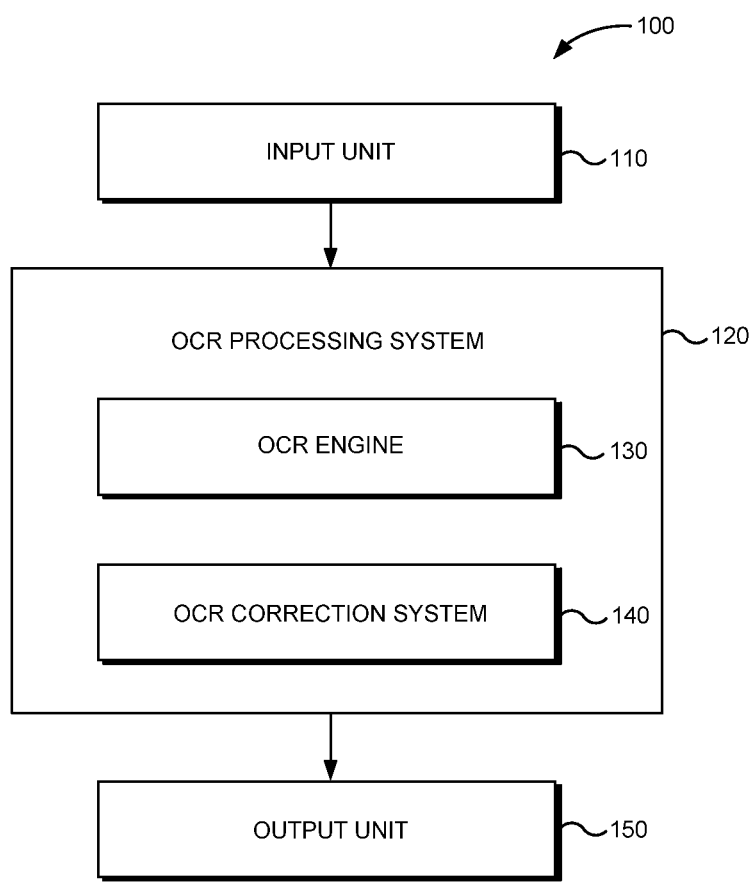
FIG. 1 illustrates of an exemplary operation environment 100 including an Optical Character recognition (OCR) processing system, in accordance with one embodiment.

Referring to FIG. 1, an exemplary operational environment 100 is illustrated which includes an input unit 110, an OCR processing system 120 and an output unit 150. Input unit 110 is provided for inputting images of printed, typewritten, handwritten, or other written text for OCR. Examples of input unit 110 include scanners, imaging devices, cameras and the like. OCR processing system 120 is in communication with input unit 110 and output unit 150. OCR processing system 120 may include an OCR engine 130 and an OCR correction system 140, as shown.

The OCR engine 130 may be configured to apply an OCR process to recognize text in digital documents or images provided via input unit 110. The OCR correction system 140 may be utilized for detecting and correcting errors in the OCR process. The OCR processing system 120 may be an application installed on a computing device, such as a desktop or a laptop computer, or other computing device. Output unit 150 may be utilized for receiving the corrected results generated by OCR processing system 120. Examples of the output unit 150 include a display monitor, printer, or other computing device.

Figure 2:
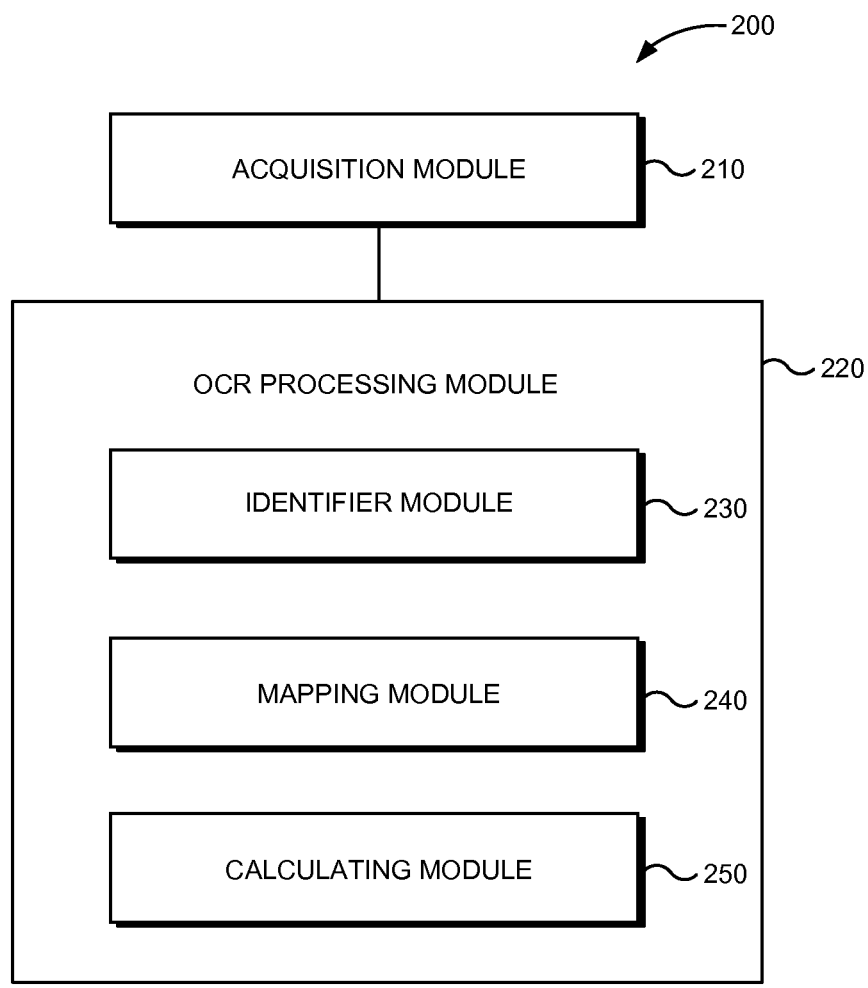
FIG. 2 is a block diagram illustrating an exemplary system for enhanced optical character recognition, in accordance with an embodiment of the present invention.

Referring to FIG. 2 is a block diagram illustrating an exemplary enhanced optical character recognition system 200, in accordance with one embodiment. The system enhanced optical character recognition 200 includes an acquisition module 210 and an OCR processing module 220. The acquisition module 210 identifies one or more sample characters that are provided to OCR engine 130 for recognition. The acquisition module 210 compares a sample character with a template character and scales the sample character and the template character to a similar sized grid (for example 32×32 pixel grid).

The OCR processing module 220 may include an identifier module 230 operable for identifying pixels in the sample character and the template character in the grid. A pixel identified by the identifier module 230 has a coordinate indicating its position in the grid. The identifier module 230 may be utilized to identify a plurality of contour pixels in the sample character and a plurality of contour pixels in the template character. A contour pixel is a pixel that defines the edge of a character. In other words, a contour pixel in at least one side is juxtaposed next to a pixel that is associated with a background of the subject character.

The OCR processing module 220 may also include a mapping module 240 that maps a plurality of contour pixels in a sample character to a plurality of corresponding contour pixels in a corresponding template character. In one implementation, for a target contour pixel in the sample character, the mapping module 240 finds the closest corresponding contour pixel in the template character (as if the sample grid was overlapping the template grid), wherein the target contour pixel in the sample character and the corresponding template pixel have at least one contour gradient in common, as provided in further detail below.

The OCR processing module 220 may further include a calculating module 250 that calculates a distance for each mapping (i.e. the distance from a target contour pixel in the sample character to the corresponding contour pixel or pixels in the template character. The calculating module 250 may calculate an average value of the distances between the sample contour pixels and the corresponding template contour pixels and match the sample character and the template character based on the average value. If the calculated average value is within a predetermined threshold value, then it may be determined that the sample character is a match for the template character.

Various algorithms may be used to calculate the distance for a mapping between two corresponding pixels. In one example, the distance between a pixel in the sample and a pixel in the template is calculated as the Euclidean distance between the two pixels, taking into account a common gradient. The Euclidian distance between two pixels may be calculated according to the following formula, in accordance with one or more embodiments, where P1 is the sample pixel, P2 is the template pixel and x and y are the coordinates in a grid with x representing the horizontal coordinate and y representing the vertical coordinate:

$$d=\sqrt{(P_{1_x}-P_{2_x})^2+(P_{1_y}-P_{2_y})^2}$$

Figure 3:
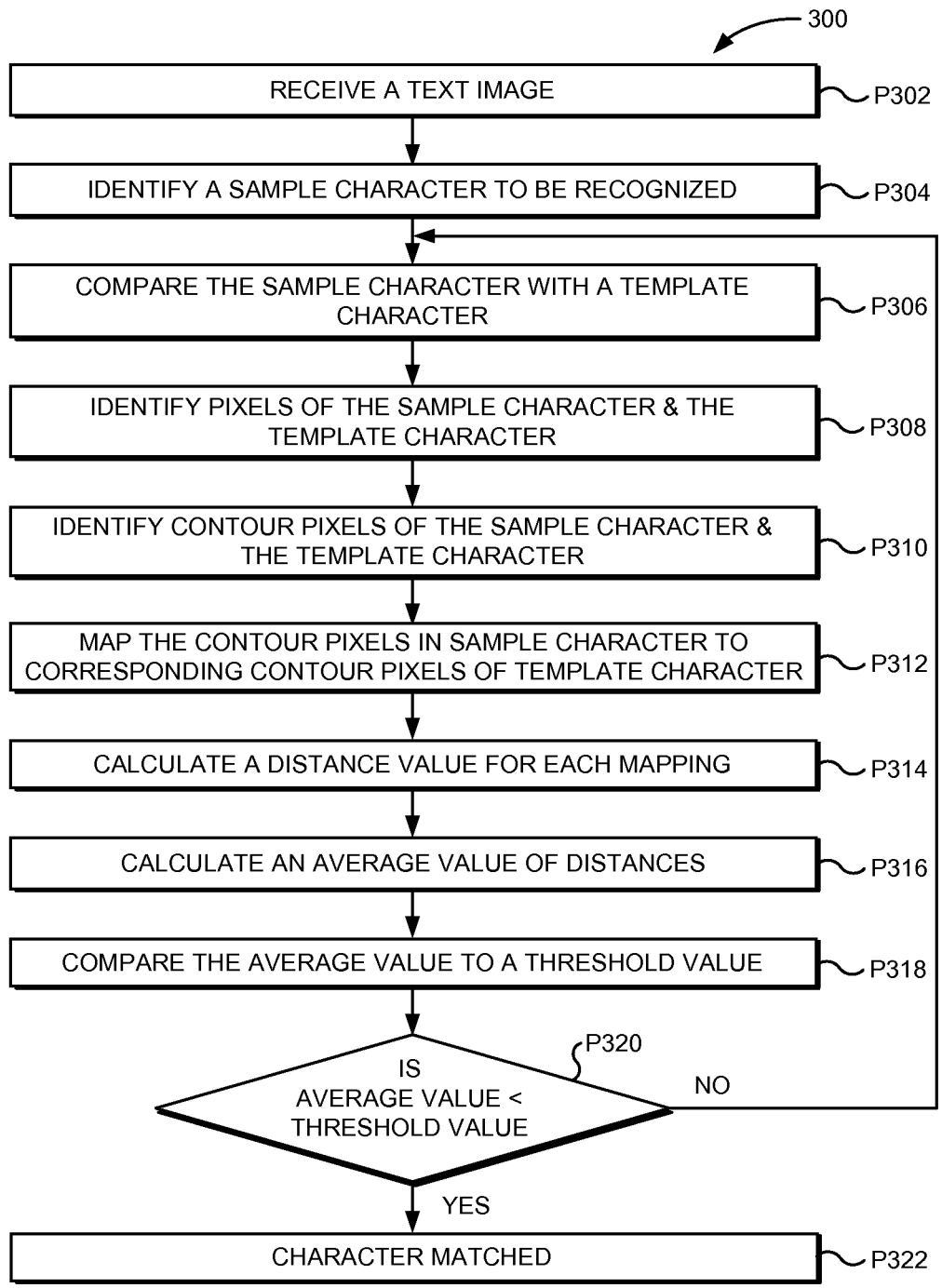
FIG. 3 is a flowchart illustrating a method for enhanced optical character recognition, in accordance with an embodiment of the present invention.
Figure 5A:
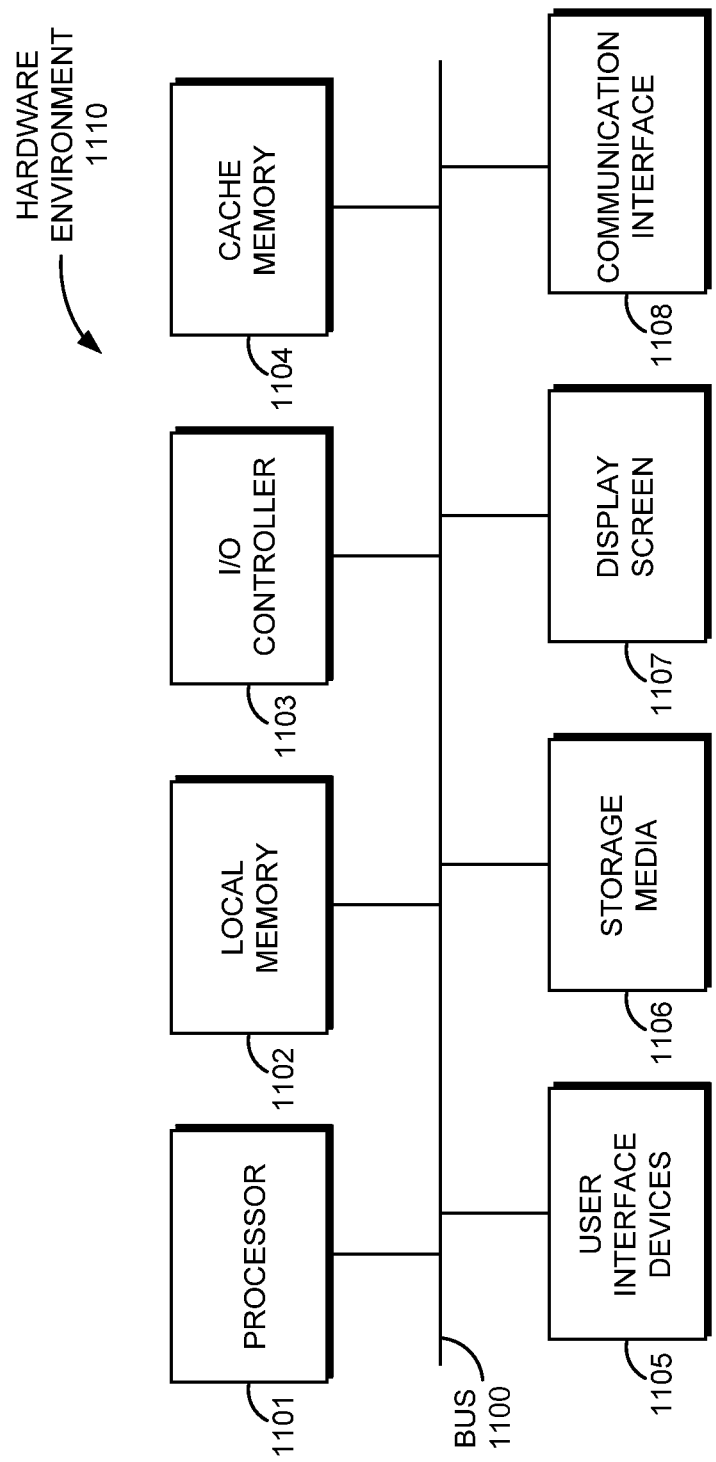
FIGS. 5A and 5B are block diagrams of hardware and software environments in which the disclosed systems and methods may operate, in accordance with one or more embodiments.
Figure 5B:
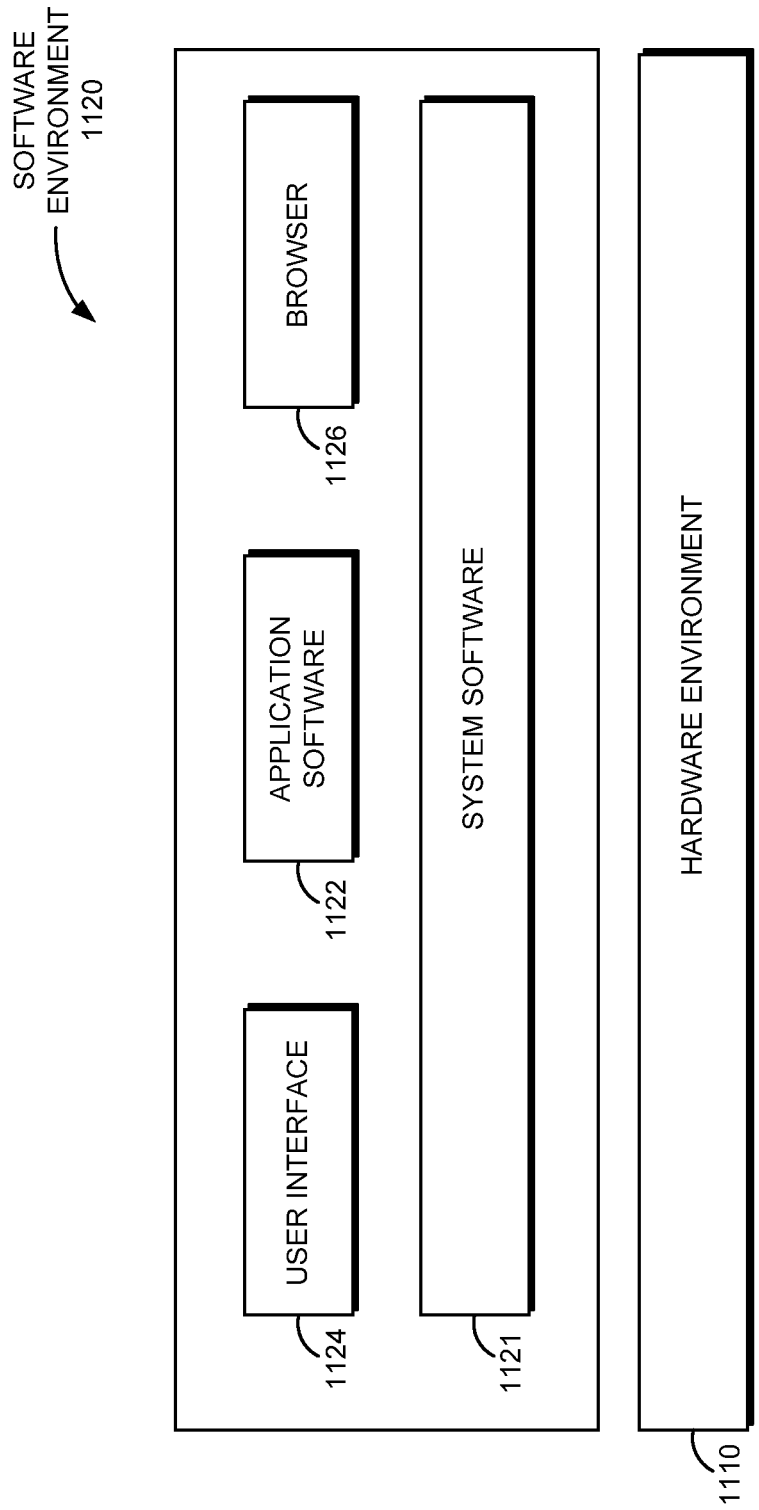

Referring to FIG. 3, a flow diagram illustrating a method 300 for enhanced optical character recognition, in accordance with one embodiment is provided. As shown, a text image may be received (P302). Within the text image, a sample character to be recognized may be identified (P304). The sample character may be compared to a template character (P306). The template character may be a character that is determined to be the closes match to the sample character in accordance to a predetermined criteria (e.g., a threshold number of common contour gradients). The sample character and the template character may be scaled to a grid of same size. The individual pixels that make up the sample character and the template character may then be identified (P308) so that for a pixel in the sample character one or more corresponding pixels in the template character may be identified.

Accordingly, a plurality of contour pixels in the sample character and a plurality of contour pixels in the template character are identified (P310). The contour pixels of the sample character are mapped onto the corresponding contour pixels of the template character (P312). For a target contour pixel in the sample character, the closest corresponding contour pixel in the template is identified such the target contour pixel in the sample character and the corresponding template pixel share at least one gradient (P314). A distance value for the mapping may be calculated by way of determining the distance from the target contour pixels in the sample character to the corresponding template contour pixels (S316).

Depending on implementation, various algorithms may be used to calculate the distance for a mapping between two corresponding characters based on the distance value calculated for the mapping between the sample character and the template character. In one exemplary implementation, an average value of the distances between the individual pixel in the sample character and the template character is calculated (P318). In one embodiment, the average value of the distances is calculated according to the following formula:

$$Avg.\ value\ of\ distances = \frac{\text{Sum of distance values of each mapping}}{\text{Total number of mappings}}$$

The calculated average value of the distances may be compared to a threshold value. If the calculated average value is within a predetermined range of the threshold value (P320), then it may be determined that the sample character is a match for the template character (P322). In one implementation, the threshold value may have an inverse relation with the accuracy of the OCR (i.e., the lower the threshold value, the greater the accuracy of recognition). As such, if the average value is not within a predetermine range of the threshold value, then it may be determined that the sample character and the template character do not match and the sample character may then be compared to another template character.

In one embodiment, to further increase the recognition accuracy of the method provided above, an additional process may be implemented to take into account a penalty value for multiple mappings from multiple sample pixels to a single template pixel. As such, the number of sample pixels with multiple mapping onto a template pixel may be determined. If the number of multiple mappings exceeds a target value (e.g., a penalty threshold), then a penalty may be applied to the calculated average value noted earlier. The target value and the corresponding penalty may be adjusted accordingly, so that for example a higher penalty value is associated with a larger target value.

In one implementation, to further increase the recognition accuracy, a reverse mapping from the template character to the sample character may also be performed. For the reverse mapping, the contour pixels of the template character are mapped onto the corresponding contour pixels of the sample character and a reverse distance value is obtained. Based on the calculated values for the direct mapping and the reverse mapping, an average value of the scores between direct mapping and reverse mapping is calculate.

Referring to FIGS. 4(A), 4(B) and 4(C), an illustrative non-limiting example is provided. It is noteworthy that in the details provided below with respect to FIGS. 4(A) through 4(B), is by way of example, and should not be construed as narrowing the scope of the claimed subject matter. As shown, a sample character is provided in FIG. 4(A) and a template character is provided in FIG. 4B in association with the same grid 400. For the mapping of contour pixels, the pixels in sample character and the template character are identified based on a coordinate scheme that identifies a pixel's position in the grid.

Referring to FIGS. 4(A) and 4(B), the contour pixels of the sample character, namely S27, S37, S47, . . . , S77, and the corresponding template character, namely T42, T43, T44, . . . , T47 in grid 400 are shown. The sample character and the template character are scaled to the grid of same size. In this example the grid 400 is 8×8 pixels. FIG. 4(C) illustrates the mapping of the contour pixels of the sample character to the contour pixels of the template character. As shown, for a target contour pixel in the sample character, the closest corresponding contour pixel or pixels in the template are identified such that the target contour pixel in the sample character and the corresponding template pixel share at least one gradient.

For example, as shown in FIG. 4A, pixel S27 (x, y grid coordinates 2, 7) is a pixel with upper, left and lower edges next to the background pixels (e.g., white pixels), and the right edge next to another foreground (e.g., black pixel). As such, S27 is associated with contour gradients up, left and down in this context. Referring to FIG. 4B, pixel S27 maps to contour pixel T47 (grid coordinates 4, 7) in the template character because T47 has contour gradients up, left and right, and thus has two common contour gradients (up and left) with S27. Based on the formula $d=\sqrt{(P_{1_x}-P_{2_x})^2+(P_{1_y}-P_{2_y})^2}$, the distance between S27 and T47 is calculated as "d=2".

Using the same methodology, noted above, pixels S37, S47, S57, S67 and S77 map to T47, with respective distances of 1, 0, 1, 2 and 3. Other pixels in the sample character may be mapped to corresponding pixels in the template character—the additional mappings and calculation are not shown but would be easily calculated based on the details provided in this disclosure by one skilled in the art. In the above example, the sum of all distances for all mappings, may thus be calculated as:

2+1+0+1+2+3+1+1+1+1=13

An average mapping value for the sample characters may be obtained by dividing the sum of all distances by the number of contour pixels. It is noted that the number of contour pixels in the sample character does not have to be equal to the number of contour pixels in the template. Hence total number of contour pixels calculated for sample character is 11. In FIG. 4(C), the average will be:

13/11=1.18

The average value of the distances (i.e., 1.18 in this example) may be compared to a threshold value. If the average value falls below the threshold value, then it may be determined that the sample character is a match for the template character. In this example, the threshold value has an inverse relation with the accuracy of the OCR such that the lower the threshold value, the greater is the accuracy of recognition. It is noteworthy that in other implementations a different scheme may be used such that the relationship between the threshold value and the recognition accuracy is directly correlated.

In this example, a penalty value may be determined for mappings from multiple sample pixels to a single template pixel. For example, referring back to FIGS. 4(A) through 4(C), pixel T47 in the template character corresponds to six pixels S27, S37, S47, S57, S67, S77 in the sample character, whereas pixel T46 in template character corresponds to only pixel S56 in the sample character. As such, a penalty value may be associated with the multiple mappings to T47.

In one embodiment, a predetermined penalty threshold may be identified, so that a penalty is applied, if the number of multiple mappings is greater than the penalty threshold, and otherwise no penalty is applied. For example, if the penalty threshold is three in the above example, then a penalty is applied, since the T47 in the template character corresponds to six pixels in the sample character. Thus, the six mapping exceed the penalty threshold value of three. In this example, the penalty may be added to the average value calculated above such that the final score for the match between the sample character and the template character is:

1.18(average value)+6(penalty value)=7.18

As noted earlier, the penalty threshold may be adjusted in some implementations, and the penalty value corresponding to a certain penalty threshold may be also adjusted to adjust the desired accuracy with which characters are to be recognized.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 1110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, may be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for enhanced optical character recognition, the method comprising:
    identifying a sample character in a textual context to be optically recognized;
    comparing the sample character with a template character, wherein the sample characters is scaled into a first grid and the template character is scaled into a second grid;
    identifying one or more pixels in the sample character within the first grid and one or more pixels in the template character in the second grid,
        wherein the one or more pixels are identified as belonging to a foreground category in the textual content, a foreground pixel having at least N gradients corresponding to edges of the foreground pixel that are juxtaposed to a neighbor pixel,
        wherein a contour foreground pixel has at least one gradient that is neighbored by a background pixel in the textual context;
    identifying one or more template contour pixels in the template character that correspond to at least one sample contour pixel in the sample character,
    mapping the at least one sample contour pixel to the corresponding template contour pixels such that one or more distances are calculated between the at least one sample contour pixel and the respective one or more template contour pixels; and
    determining that the sample contour character and the template contour character are a match based on an analysis of the one or more distances.

2. The method of claim 1, wherein the analysis of the one or more distances comprises calculating an average value of the cumulative distances between the at least one sample contour pixel and the corresponding template contour pixels.

3. The method of claim 1, wherein the first and the second grid are of the same size.

4. The method of claim 2, wherein a distance between two corresponding pixels, a first sample contour pixel and a corresponding first template contour pixel is determined based on a first set of coordinate values associated with the first sample contour pixel in the first grid and a second set of coordinate values associated with the first template contour pixel in the second grid.

5. The method of claim 1, wherein the correspondence between a template contour pixel in the one or more template contour pixels and the at least one sample contour pixel is based on a number of gradients the template contour pixel has in common with the sample contour pixel.

6. The method of claim 4, wherein the distance between the two corresponding pixels is calculated as a Euclidean distance between the two corresponding pixels.

7. The method of claim 6, wherein the Euclidean distance is calculated according to the following formula:

$$d=\sqrt{(P_{1_x}-P_{2_x})^2+(P_{1_y}-P_{2_y})^2}; \text{ and}$$

wherein P1 is the first sample contour pixel, P2 is the first template contour pixel and x and y are coordinates in a grid with x representing the horizontal coordinate and y representing the vertical coordinate.

8. The method of claim 7, wherein the sample contour character and the template contour character are determined to be a match if the Euclidean distance calculated is within a first range from a first threshold value.

9. The method of claim 1, further comprising performing a reverse mapping from the template character to the sample character to further enhance the accuracy of the optical character recognition based on a calculation of distances between corresponding pixels identified in the reverse mapping.

10. The method of claim 1, wherein results of the analysis are discounted, in response to determining that a first number of contour sample pixels map to the same template contour pixel.

11. A system for enhanced optical character recognition, the system comprising:
 a logic unit for identifying a sample character in a textual context to be optically recognized;
 a logic unit for comparing the sample character with a template character, wherein the sample character is scaled into a first grid and the template character is scaled into a second grid;
 a logic unit for identifying one or more pixels in the sample character within the first grid and one or more pixels in the template character in the second grid,
  wherein the one or more pixels are identified as belonging to a foreground category in the textual content, a foreground pixel having at least N gradients corresponding to edges of the foreground pixel that are juxtaposed to a neighbor pixel,
  wherein a contour foreground pixel has at least one gradient that is neighbored by a background pixel in the textual context;
 identifying one or more template contour pixels in the template character that correspond to at least one sample contour pixel in the sample character,
 a logic unit for mapping the at least one sample contour pixel to the corresponding template contour pixels such that one or more distances are calculated between the at least one sample contour pixel and the respective one or more template contour pixels; and
 a logic unit for determining that the sample contour character and the template contour character are a match based on an analysis of the one or more distances.

12. The system of claim 11, wherein the analysis of the one or more distances comprises calculating an average value of the cumulative distances between the at least one sample contour pixel and the corresponding template contour pixels.

13. The system of claim 11, wherein the first and the second grid are of the same size.

14. The system of claim 12, wherein a distance between two corresponding pixels, a first sample contour pixel and a corresponding first template contour pixel is determined based on a first set of coordinate values associated with the first sample contour pixel in the first grid and a second set of coordinate values associated with the first template contour pixel in the second grid.

15. The system of claim 11, wherein the correspondence between a template contour pixel in the one or more template contour pixels and the at least one sample contour pixel is based on a number of gradients the template contour pixel has in common with the sample contour pixel.

16. A computer program product for enhanced optical character recognition, the computer program product comprising logic code embedded in a non-transitory data storage medium, wherein execution of the logic code on a computer causes the computer to:
 identify a sample character in a textual context to be optically recognized;
 compare the sample character with a template character, wherein the sample character is scaled into a first grid and the template character is scaled into a second grid;
 identify one or more pixels in the sample character within the first grid and one or more pixels in the template character in the second grid,
  wherein the one or more pixels are identified as belonging to a foreground category in the textual content, a foreground pixel having at least N gradients corresponding to edges of the foreground pixel that are juxtaposed to a neighbor pixel,
  wherein a contour foreground pixel has at least one gradient that is neighbored by a background pixel in the textual context;
 identifying one or more template contour pixels in the template character that correspond to at least one sample contour pixel in the sample character,
 map the at least one sample contour pixel to the corresponding template contour pixels such that one or more distances are calculated between the at least one sample contour pixel and the respective one or more template contour pixels; and
 determine that the sample contour character and the template contour character are a match based on an analysis of the one or more distances.

17. The computer program product of claim 16, wherein the analysis of the one or more distances comprises calculating an average value of the cumulative distances between the at least one sample contour pixel and the corresponding template contour pixels.

18. The computer program product of claim 16, wherein the first and the second grid are of the same size.

19. The computer program product of claim 17, wherein a distance between two corresponding pixels, a first sample contour pixel and a corresponding first template contour pixel is determined based on a first set of coordinate values associated with the first sample contour pixel in the first grid and a second set of coordinate values associated with the first template contour pixel in the second grid.

20. The computer program product of claim 16, wherein the correspondence between a template contour pixel in the one or more template contour pixels and the at least one sample contour pixel is based on a number of gradients the template contour pixel has in common with the sample contour pixel.

\* \* \* \* \*